United States Patent
Kim et al.

(10) Patent No.: US 12,408,070 B2
(45) Date of Patent: Sep. 2, 2025

(54) METHOD FOR PROVIDING SERVICE IN EDGE NETWORK INCLUDING MULTIPLE ACCESS POINTS, AND SYSTEM THEREFOR

(71) Applicant: Foundation of Soongsil University-Industry Cooperation, Seoul (KR)

(72) Inventors: Young Han Kim, Seoul (KR); Minh Ngoc Tran, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 747 days.

(21) Appl. No.: 17/777,529

(22) PCT Filed: Sep. 22, 2020

(86) PCT No.: PCT/KR2020/012747
§ 371 (c)(1),
(2) Date: May 17, 2022

(87) PCT Pub. No.: WO2021/101055
PCT Pub. Date: May 27, 2021

(65) Prior Publication Data
US 2022/0408234 A1    Dec. 22, 2022

(30) Foreign Application Priority Data

Nov. 19, 2019  (KR) .......... 10-2019-0148734
Apr. 7, 2020   (KR) .......... 10-2020-0042426

(51) Int. Cl.
*H04W 28/02*  (2009.01)
*H04W 4/50*   (2018.01)
(Continued)

(52) U.S. Cl.
CPC ......... *H04W 28/0268* (2013.01); *H04W 4/50* (2018.02); *H04W 12/06* (2013.01); *H04W 48/18* (2013.01); *H04W 88/08* (2013.01)

(58) Field of Classification Search
CPC ... H04W 4/50; H04W 12/06; H04W 28/0268; H04W 48/18; H04W 88/08
See application file for complete search history.

(56) References Cited

U.S. PATENT DOCUMENTS

2010/0131672 A1*  5/2010  Karaoguz ........... H04L 67/141
                                              709/238
2015/0143473 A1*  5/2015  Jung ...................... H04L 63/18
                                              726/4

(Continued)

FOREIGN PATENT DOCUMENTS

JP    4724184 B2     7/2011
JP    2018-064142 A  4/2018

(Continued)

*Primary Examiner* — Brian P Cox
(74) *Attorney, Agent, or Firm* — Stein IP, LLC

(57) ABSTRACT

Provided is a method for providing a service in an edge network system including a plurality of access points including steps of transmitting, by a terminal, a service request message including a name of a service to be provided to a first access point, transmitting, by the first access point, a service request response message including an estimated service execution time and data for authentication to the terminal, performing authentication between the terminal and the first access point based on the data for authentication for the estimated service execution time, and providing, by the first access point, a content corresponding to the service request message to the terminal, when the authentication between the terminal and the first access point is successful.

10 Claims, 6 Drawing Sheets

(51) Int. Cl.
*H04W 12/06* (2021.01)
*H04W 48/18* (2009.01)
*H04W 88/08* (2009.01)

(56) References Cited

U.S. PATENT DOCUMENTS

2016/0226981 A1* 8/2016 McCann .................. H04L 63/10
2021/0385884 A1* 12/2021 Niemela ............... H04W 76/10

FOREIGN PATENT DOCUMENTS

| KR | 10-1698094 B1 | 1/2017 |
| KR | 10-2018-0081965 A | 7/2018 |
| KR | 10-2019-0110988 A | 10/2019 |

* cited by examiner

METHOD FOR PROVIDING SERVICE IN EDGE NETWORK INCLUDING MULTIPLE ACCESS POINTS, AND SYSTEM THEREFOR

TECHNICAL FIELD

The present invention relates to a method for providing a service in an edge network including a plurality of access points and a system therefor.

BACKGROUND ART

A consumer-centered service is one of the major categories of multi-access edge computing (MEC) use cases classified by the European telecommunication standards institute (ETSI). Since mobile devices may lack computing capacity, battery power, storage capacity, etc., it is necessary to offload compute-intensive tasks (e.g., AR, VR, data analysis, video analysis, etc.) to the MEC. The MEC utilizes computer resources for providing a service result of a low latency time through input data received from consumers. However, since limited resources of the MEC and requirements for each service are varied, an efficient runtime service distribution method is required. These methods include algorithms for finding running service instances and methods for finding an optimal node for a service path.

Information-centered networking is a new future Internet architecture technology capable of searching service instances based on name information of the instances. In a recent study, a service allocation method has been proposed while solving a service search problem using such a structure. However, in these studies, only available computing resources and inter-node latency time are considered in a process of selecting the optimal node for service deployment.

DISCLOSURE

Technical Problem

An object of the present invention is to provide a method for providing an optimal and efficient service for the same service request in a network by a named data networking service as well as computing resources and latency problems which have been considered in existing studies.

Technical Solution

According to an aspect of the present invention, there is provided a method for providing a service in an edge network system including a plurality of access points including steps of transmitting, by a terminal, a service request message including a name of a service to be provided to a first access point, transmitting, by the first access point, a service request response message including an estimated service execution time and data for authentication to the terminal, performing authentication between the terminal and the first access point based on the data for authentication for the estimated service execution time, and providing, by the first access point, a content corresponding to the service request message to the terminal, when the authentication between the terminal and the first access point is successful.

According to an exemplary embodiment, the service request message may include information on quality of service (QoS) constraint, terminal identification (ID) information, and session ID information.

According to an exemplary embodiment, the method for providing the service may further include, after the transmitting of the service request message, confirming whether to provide the service to be provided by the first access point, transmitting the service request message to another access point constituting the edge network when the service to be provided may not be provided by the first access point, and transmitting the service request response message to the terminal, by a second access point capable of providing the service to be provided.

According to an exemplary embodiment, the method for providing the service may further include confirming, by the controller constituting the edge network, an access point that satisfies a predetermined QoS condition among the access points constituting the edge network, when there is no other access point capable of providing the service to be provided, determining a service execution cost based on a service type to be provided for each access point that satisfies the predetermined QoS condition, and determining an access point to provide the service to be provided, based on the service execution cost determined for each access point.

According to an exemplary embodiment, the service execution cost may decrease as a required latency time of the service to be provided is shorter and increase as the number of resources required for the service to be provided is larger.

According to an exemplary embodiment, the method for providing the service may further include confirming the number of times providing the same service as the service to be provided previously for each access point, when there is no access point that satisfies the predetermined QoS condition, and determining an access point closest to the access point corresponding to the highest number of times as an access point to provide the service to be provided.

According to another aspect of the present invention, there is provided an edge network system including a terminal configured to transmit a service request message including a name of a service, and a first access point configured to receive the service request message from the terminal, transmit a service request response message including an estimated service execution time and data for authentication to the terminal, perform authentication with the terminal based on the data for authentication for the estimated service execution time, and provide a content corresponding to the service request message to the terminal when the authentication is successful.

According to an exemplary embodiment, the service request message may include information on quality of service (QoS) constraint, terminal identification (ID) information, and session ID information.

According to an exemplary embodiment, the first access points may confirm whether to provide the service to be provided, and transmit the service request message to another access point constituting the edge network when the service to be provided may not be provided by the first access point, and the edge network system may further include a second access point configured to transmit the service request response message to the terminal in response to the service request message.

According to an exemplary embodiment, the edge network system may further include a controller configured to confirm an access point that satisfies a predetermined QoS condition among the access points constituting the edge network, when there is no other access point capable of providing the service to be provided, determine a service execution cost based on a service type to be provided for each access point that satisfies the predetermined QoS condition, and determine an access point to provide the service to be provided based on the service execution cost determined for each access point.

According to an exemplary embodiment, the service execution cost may decrease as a required latency time of the service to be provided is shorter and increase as the number of resources required for the service to be provided is larger.

According to an exemplary embodiment, the controller may confirm the number of times providing the same service as the service to be provided previously for each access point when there is no access point that satisfies the predetermined QoS condition and determine an access point closest to the access point corresponding to the highest number of times as the access point to provide the service to be provided.

Advantageous Effects

According to an exemplary embodiment disclosed in the present invention, it is possible to provide a name-based service in an edge network. In addition, according to an exemplary embodiment disclosed in the present invention, since an access point to provide a service may be determined based on a required latency rate and a required amount of resources for a requested service, it is possible to improve a network system efficiency.

BEST MODE

Figure 1:
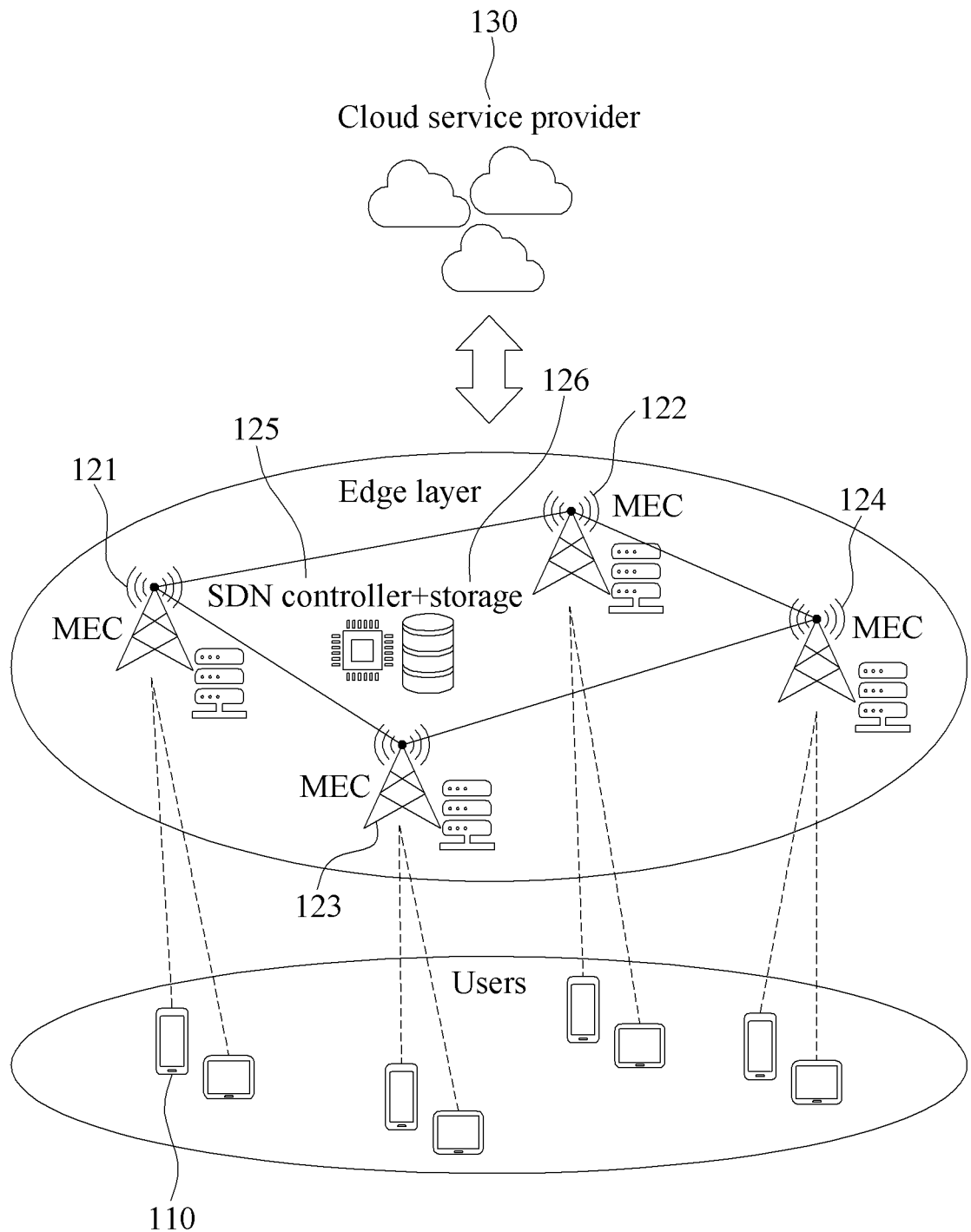
FIG. 1 is a diagram illustrating a configuration of a system according to an exemplary embodiment of the present invention.

The present invention may be variously modified and have various exemplary embodiments, and specific exemplary embodiments will be described in detail with reference to drawings. However, the present invention is not limited to specific exemplary embodiments, and it should be understood that the present invention covers all modifications, equivalents, and replacements included within the idea and technical scope of the present invention. In describing each drawing, like reference numerals have been used for like components.

Terms such as first, second, A, B, and the like may be used for describing various components, but the components are not limited by the terms. These terms may be only used to distinguish one component from the other component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

It should be understood that, when it is described that a component is "connected to" or "accesses" the other component, the component may be directly connected to or access the other component or a third component may be present therebetween. In contrast, it should be understood that, when it is described that a component is "directly connected to" or "directly accesses" the other component, it should be understood that no component is present therebetween.

Terms used in the present application are used only to describe specific exemplary embodiments, and are not intended to limit the present invention. Singular expressions used herein include plurals expressions unless otherwise explicitly described to the contrary in the context. The terms "comprising" or "having" are inclusive and therefore specify the presence of stated features, integers, steps, operations, elements, components, or combinations thereof, but do not preclude the presence or addition of one or more other features, integers, steps, operations, elements, components, or combinations thereof.

Unless otherwise contrarily defined, all terms used herein including technological or scientific terms have the same meanings as those generally understood by those skilled in the art to which the present invention pertains. Terms which are defined in a generally used dictionary should be interpreted to have the same meaning as the meaning in the context of the related art, and are not interpreted as an ideal meaning or excessively formal meanings unless otherwise defined in the present application.

Throughout the specification, unless explicitly described to the contrary, when any part includes any component, it will be understood to imply the inclusion of stated components but not the exclusion of any other component.

Hereinafter, preferred exemplary embodiments of the present invention will be described in detail with reference to the accompanying drawings.

FIG. 1 is a diagram illustrating a configuration of a system according to an exemplary embodiment of the present invention.

According to an exemplary embodiment, in an edge layer constituting the system, a plurality of multi-access edge computings (MECs) 121, 122, 123, and 124 connected by an NDN network structure and an MEC server may be disposed, and the MEC server may be controlled by an SDN controller 125. According to various exemplary embodiments, a central database may use a method of storing a service image provided by a service provider 130 and bringing the corresponding service image stored in a centralized storage 126 when the corresponding service image is not cached in the MEC whenever a service instance is deployed.

According to an exemplary embodiment, when the provision of a specific service is requested by the user, a terminal 110 may request a service to at least one MEC constituting the edge layer, and the terminal 110 may receive a content for providing the service from the at least one MEC. According to various exemplary embodiments, the terminal may access a service instance through the edge layer, upload input data, and receive a result through interest and data packet exchange. That is, according to an exemplary embodiment disclosed in the present invention, a network operation based on name data networking (NDN) may be enabled.

Figure 2:
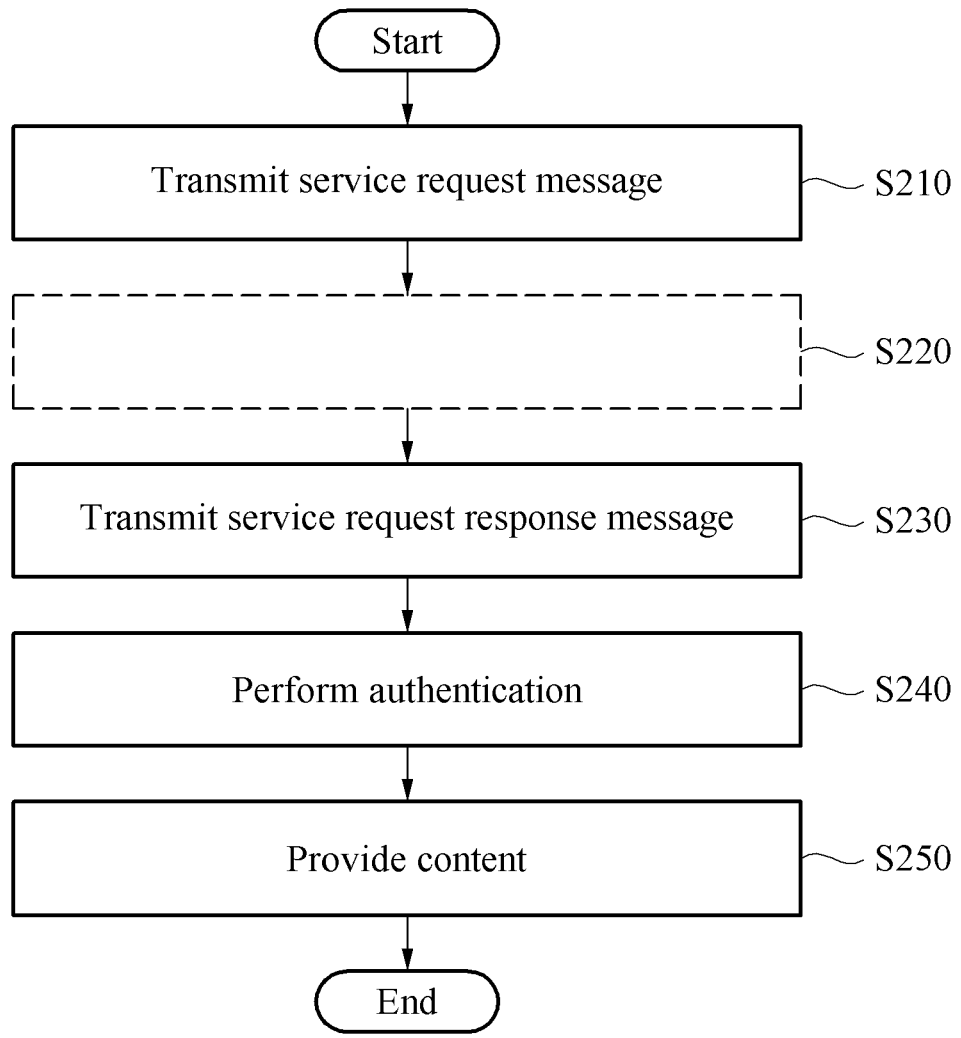
FIG. 2 is a flowchart illustrating a method for providing a service according to an exemplary embodiment of the present invention.

FIG. 2 is a flowchart illustrating a method for providing a service according to an exemplary embodiment of the present invention. The flowchart illustrated in FIG. 2 is illustrated in FIG. 1 and may be performed by the edge network system.

According to an exemplary embodiment, in step S210, the terminal may transmit a service request message including a name of a service to be provided to a first access point. According to various exemplary embodiments, the first access point may be the MEC mentioned in the description of FIG. 1.

According to an exemplary embodiment, a plurality of access points may be disposed in the edge layer of the edge network system, and the terminal may transmit a service request message to one access point of the plurality of access points. According to various exemplary embodiments, the terminal may transmit a service request message to a physically or communicatively closest access point.

According to an exemplary embodiment, the service request message may include information on quality of service (QoS) constraint, terminal identification (ID) information, session ID information, and inputsize information. For example, when the terminal requests to provide a movie content 'Parasite', the terminal may include and transmit information on 'Parasite', 'terminal ID', 'session ID', etc., which are the names of the requested service in the service request message, to the first access point.

According to an exemplary embodiment, in step S230, the first access point may transmit a service request response message including an estimated service execution time and data for authentication to the terminal. According to various exemplary embodiments, the first access point may primarily transmit the estimated service execution time to a header of data transmitted to the terminal, and secondly, may transmit a check request message for checking whether the requested data received from the terminal is correct to the terminal. For example, the first access point may transmit a message for confirming whether information on the terminal ID, the session ID, the service name, etc. received through step S210 is correct to the terminal.

According to an exemplary embodiment, in step S240, authentication between the terminal and the first access point may be performed based on the data for authentication for the estimated service execution time. According to various exemplary embodiments, when the authentication between the terminal and the first access point is successful, the first access point may provide a content corresponding to the service request message to the terminal through step S250. Citing the previous example, the first access point may provide the movie content 'Parasite' to the terminal.

Meanwhile, the exemplary embodiment illustrated in FIG. 2 relates to a case in which a service to be provided by the terminal is stored in an access point to which the terminal transmits the service request message. In some cases, the service to be provided by the terminal may not be stored in the access point to which the terminal has transmitted the service request message. In this case, step S220 may be added to the flowchart illustrated in FIG. 2, and a detailed description of step S220 will be described below with reference to FIG. 4.

Figure 3:
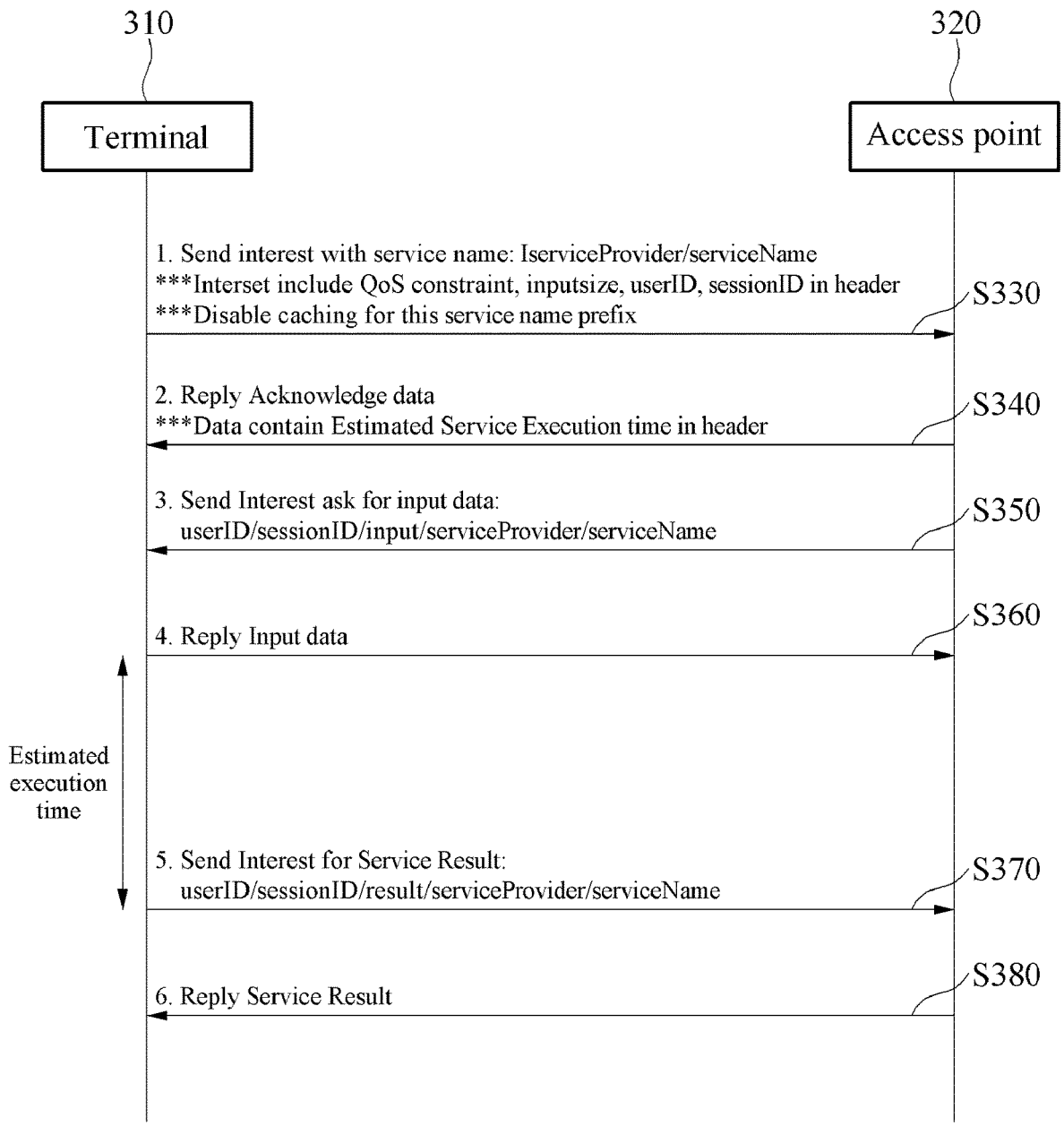
FIG. 3 is a diagram for describing an operation of the system according to an exemplary embodiment of the present invention.

FIG. 3 is a diagram for describing an operation of the system according to an exemplary embodiment of the present invention. The flowchart illustrated in FIG. 3 is illustrated in FIG. 1 and may be performed by the edge network system.

According to an exemplary embodiment, a terminal 310 may transmit an interest including a service provider and a service name to an access point 320 through step S300. According to various exemplary embodiments, the interest may correspond to the service request message mentioned in the description of FIG. 1.

According to an exemplary embodiment, the access point 320 may transmit an acknowledge (ack) message corresponding to the interest received in step S310 to the terminal 310 through step S340. According to various exemplary embodiments, the header of the ack message may include information on the estimated service execution time.

According to an exemplary embodiment, the access point 320 may transmit an interest for confirming information on data requested by the terminal 310 to the terminal 310 through step S350. According to various exemplary embodiments, the interest may include information about a terminal ID, a session ID, an input, a service provider, and a service name.

According to an exemplary embodiment, the terminal 310 may transmit data for authentication to the access point 320 through step S360, and when the data authentication is successfully terminated, the terminal 310 may transmit an interest on the authentication result to the access point 320 through step S370. According to various exemplary embodiments, the interest may include information about a terminal ID, a session ID, an input, a service provider, and a service name.

According to an exemplary embodiment, the access point 320 may provide the service requested by the terminal 310 to the terminal 310 through step S380.

Figure 4:
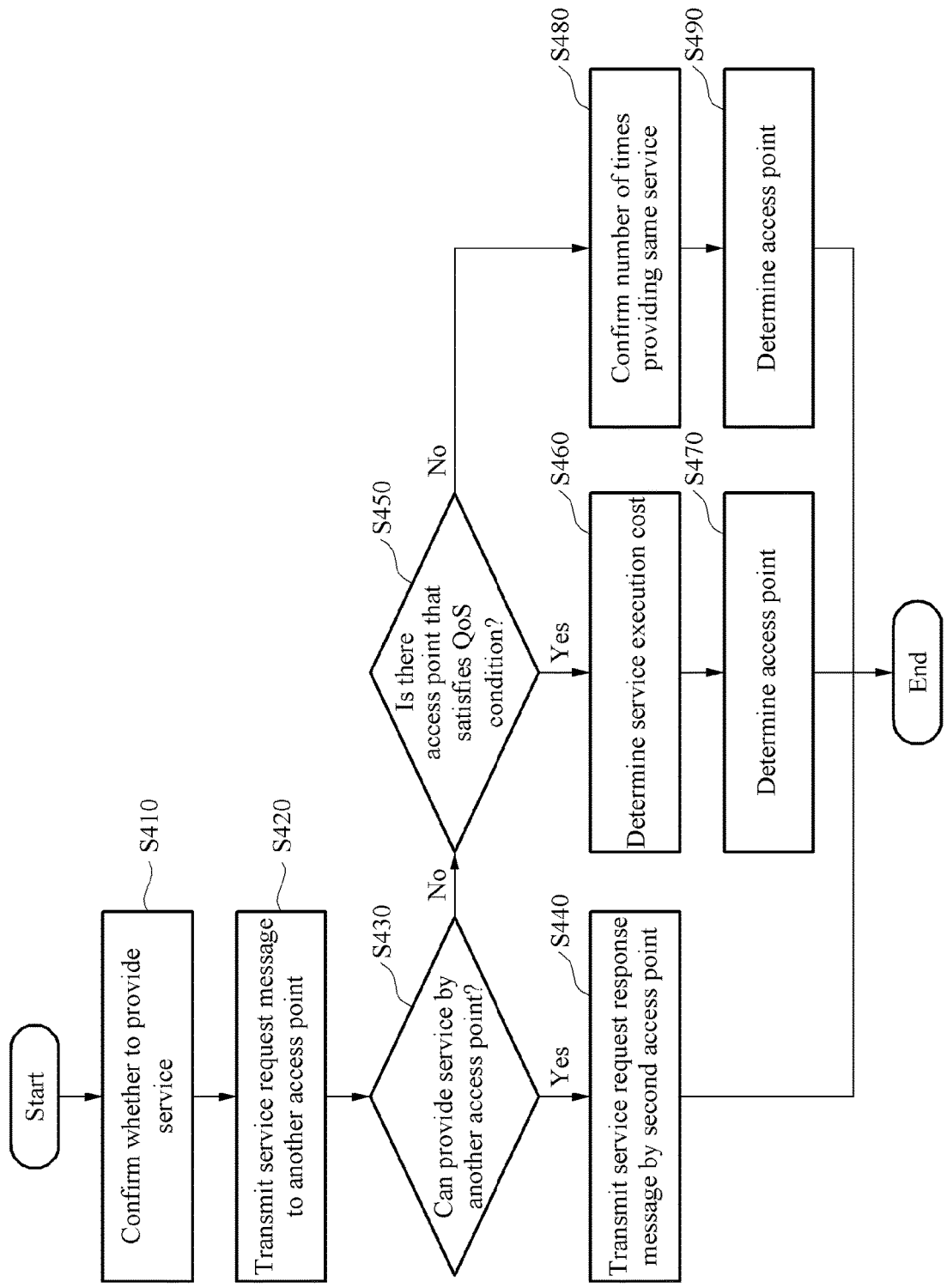
FIG. 4 is a flowchart illustrating a method for determining an access point according to an exemplary embodiment of the present invention.

FIG. 4 is a flowchart illustrating a method for determining an access point according to an exemplary embodiment of the present invention. The flowchart illustrated in FIG. 4 is illustrated in FIG. 1 and may be performed by the edge network system.

According to an exemplary embodiment, in step S410, the first access point may confirm whether to provide a service requested by the terminal. According to various exemplary embodiments, when the first access point may provide the service requested by the terminal in step S410, the first access point may transmit a service request response message to the terminal through step S230 illustrated in FIG. 2. On the other hand, when the first access point cannot provide the service (for example, when the service requested by the terminal is not stored in the first access point), the first access point may transmit a service request message to another access point constituting the edge layer through step S420. That is, the first access point may advertise that the terminal has requested a specific service to another access point.

According to an exemplary embodiment, through step S430, each access point receiving the service request message from the first access point may confirm whether to provide the service requested by the terminal. According to various exemplary embodiments, when at least one access point among the access points constituting the edge layer may provide the service requested by the terminal, the corresponding access point (e.g., a second access point) may transmit a service request response message to the terminal through step S440.

If the terminal can communicate only with the first access point and cannot communicate with another access point, the second access point may transmit the service request response message through the first access point. On the other hand, if the second access point can directly communicate with the terminal, the second access point may directly transmit the service request response message to the terminal.

According to an exemplary embodiment, in step S430, it may be determined that there is no access point capable of providing the service requested by the terminal in the edge layer. In this case, through step S450, the controller constituting the edge network may confirm an access point that satisfies a predetermined QoS condition among the access points constituting the edge network.

According to an exemplary embodiment, in step S450, when it is determined that there is an access point that satisfies the QoS condition, the controller may determine a service execution cost based on a service type to be provided for each access point that satisfies the QoS condition. According to various exemplary embodiments, in step S470, the controller may determine an access point to provide the service to be provided for the terminal based on the service execution cost determined for each access point. Meanwhile, the detailed descriptions of steps S460 and S470 will be described below with reference to FIG. 5.

According to an exemplary embodiment, in step S450, when it is determined that there is no access point that satisfies the QoS condition, the controller may confirm the number of times providing the same service as the service to be provided for the terminal previously for each access point through step S480. According to various exemplary embodiments, in step S490, the controller may determine an access point closest to the access point corresponding to the highest number of times as the access point to provide the service to be provided for the terminal. Meanwhile, the detailed descriptions of steps S480 and S490 will be described below with reference to FIG. 6.

Figure 5:
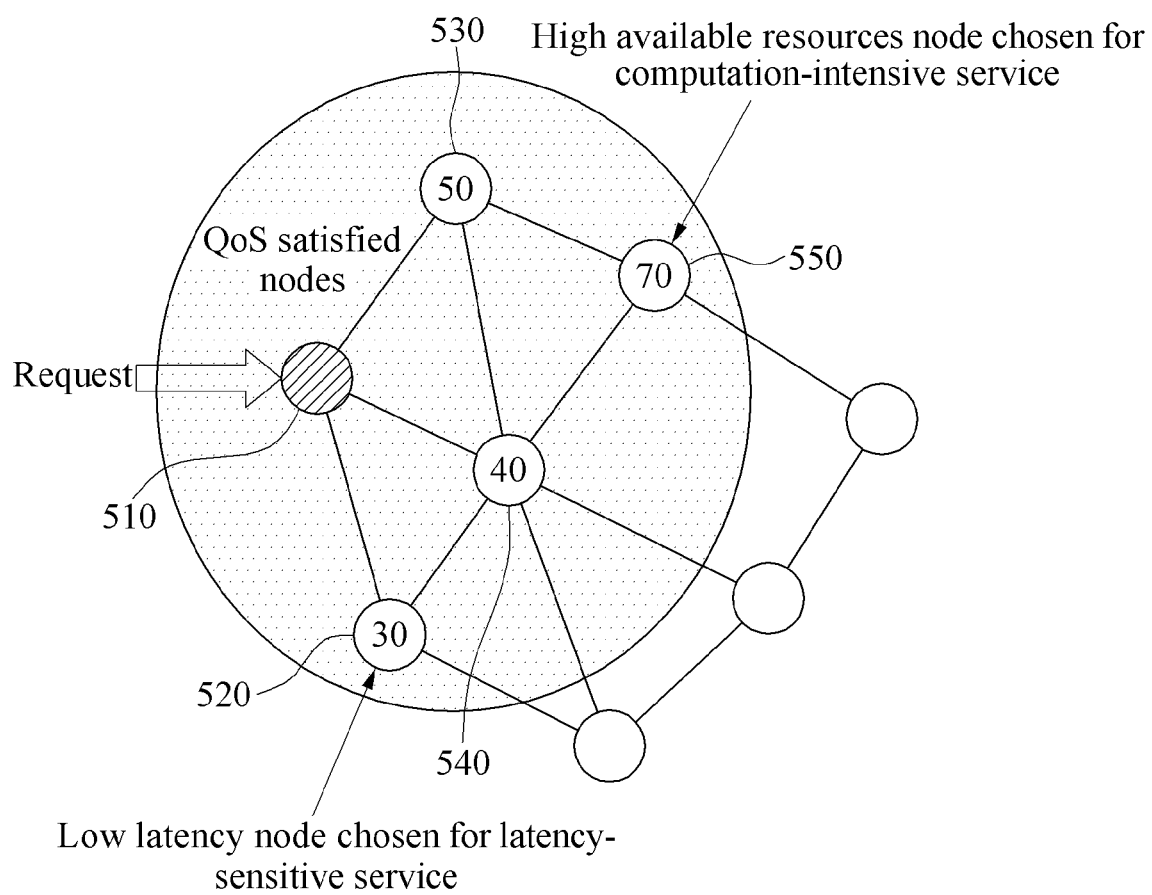
FIG. 5 is a diagram for describing a method for determining an access point when there is an access point that satisfies a predetermined QoS condition according to an exemplary embodiment of the present invention.

FIG. 5 is a diagram for describing a method for determining an access point when there is an access point that satisfies a predetermined QoS condition according to an exemplary embodiment of the present invention.

According to an exemplary embodiment, when a first access point 510 has received a service request message from a terminal and cannot provide a service requested by the terminal among access points constituting an edge layer, a controller may confirm whether there is an access point that satisfies the QoS condition. In FIG. 5, according to an exemplary embodiment, a second access point 520, a third access point 530, a fourth access point 540, and a fifth access point 550 constituting the edge layer are access points that satisfy the predetermined QoS condition.

According to an exemplary embodiment, the controller may determine a service execution cost for each of the second access point 520, the third access point 530, the fourth access point 540, and the fifth access point 550. According to various exemplary embodiments, a service execution cost (SEC) may be determined by Equation 1 below.

$$SEC = (1 - \text{service type parameter}) \times \text{closeness cost} + (\text{service type parameter} \times \text{resource cost}) \quad \text{[Equation 1]}$$

Here, the service type parameter means that a service requested by the terminal is a service type sensitive to a latency time if the service type parameter is lower than 0.5 as a value between 0 and 1 and may mean that the service requested by the terminal is a service type sensitive to a resource amount if the service type parameter is higher than 0.5. Meanwhile, the closeness cost may be a ratio of a maximum allowable latency time to a latency time between an access point to be considered and the terminal, and the resource cost may be a ratio of CPU resources required to execute the service to CPU resources available at the access point to be considered.

According to an exemplary embodiment, through Equation 1, the controller may determine the service execution cost of the second access point 520 as 30, the service execution cost of the third access point 530 as 50, the service execution cost of the fourth access point 540 as 40, and the service execution cost of the fifth access point 550 as 70. In this case, when the service requested by the terminal is a service type sensitive to a latency time, the controller may determine the second access point 520 as an access point to provide the service requested by the terminal, and may determine the fifth access point 550 as an access point to provide the service requested by the terminal when the service requested by the terminal is a service type sensitive to a service required resource.

Figure 6:
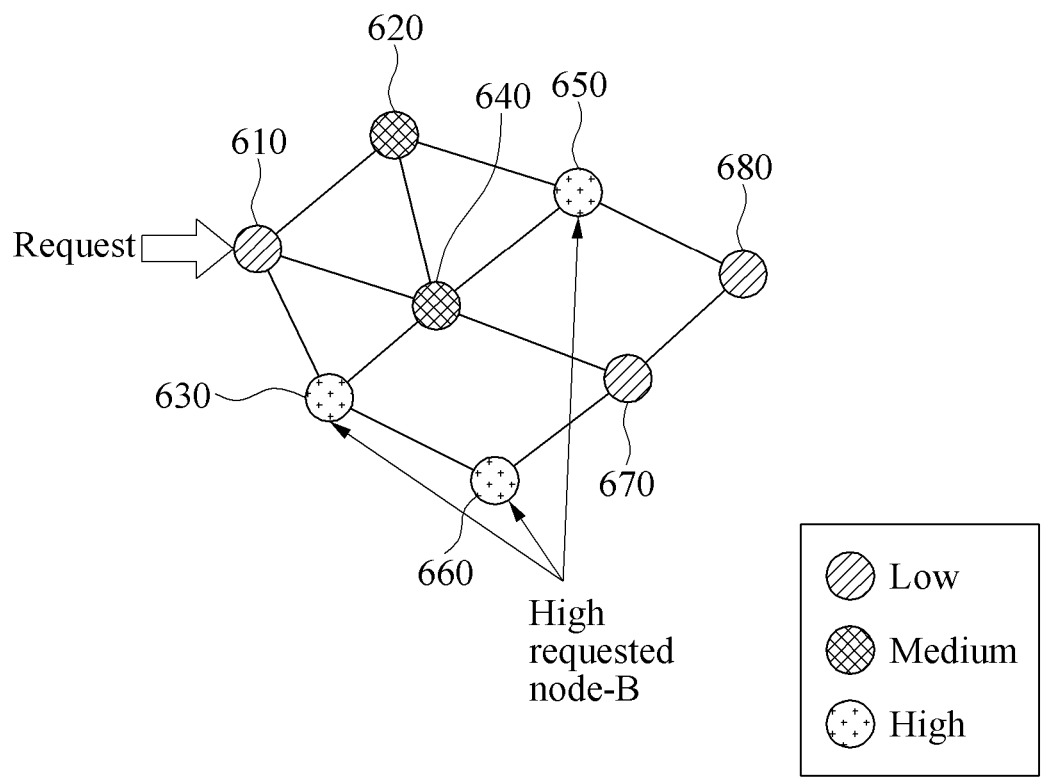
FIG. 6 is a diagram for describing a method for determining an access point when there is no access point that satisfies a predetermined QoS condition according to an exemplary embodiment of the present invention.

FIG. 6 is a diagram for describing a method for determining an access point when there is no access point that satisfies a predetermined QoS condition according to an exemplary embodiment of the present invention.

According to an exemplary embodiment, when the first access point 510 has received the service request message from the terminal and cannot provide a service requested by the terminal among the access points constituting the edge layer, the controller may confirm whether there is an access point that satisfies the QoS condition. FIG. 6 illustrates a case in which all access points constituting the edge layer do not satisfy the QoS condition as an exemplary embodiment.

According to an exemplary embodiment, the controller may confirm the number of times providing the same service as the service to be provided previously for each access point. For example, when the terminal requests the movie content 'Parasite', the controller may confirm the number of times providing the movie content 'Parasite' in the past by the second access point 620.

According to an exemplary embodiment, the controller may determine a grade for each access point by confirming the number of times providing the same service as the service requested by the terminal in the past. For example, the grade may be determined by classifying the access point into a first case where the same service as the service requested by the terminal has been rarely provided in the past (for example, a case where the number of times providing the service as the service requested by the terminal is 1 or less), a second case where the same service as the service requested by the terminal has been often provided in the past (for example, a case where the number of times providing the service as the service requested by the terminal is 3 or less and more than 1), and a third case where the same service as the service requested by the terminal has been mostly provided in the past (for example, a case where the number of times providing the service as the service requested by the terminal is more than 3).

FIG. 6 is a diagram illustrating a case where a seventh access point 670 and an eighth access point 680 correspond to the first case, a case where a second access point 620 and a fourth access point 640 correspond to the second case, and a case where a third access point 630, a fifth access point 650, and a sixth access point 660 correspond to the third case.

According to an exemplary embodiment, as illustrated in FIG. 6, the controller may determine an access point closest to the access point corresponding to the highest number of times as an access point to provide the service to be provided for the terminal. That is, citing the case illustrated in FIG. 6, the controller may determine the fourth access point 640 closest to the third access point 630, the fifth access point 650, and the sixth access point 660 as the access point to provide the service to be provided for the terminal.

The above description just illustrates the technical spirit of the present invention and various changes and modifications can be made by those skilled in the art to which the present invention pertains without departing from an essential characteristic of the present invention. Therefore, the exemplary embodiments disclosed in the present invention are not intended to limit the technical spirit but describe the present invention and the technical spirit of the present invention is not limited by these exemplary embodiments. The protective scope of the present invention should be construed based on the appended claims, and all the technical spirits in the equivalent scope thereof should be construed as falling within the scope of the present invention.

The invention claimed is:

1. A method for providing a service in an edge network system including a plurality of access points, the method comprising steps of:
   transmitting, by a terminal, a service request message including a name of a service to be provided to a first access point;
   transmitting, by the first access point, a service request response message including an estimated service execution time and data for authentication to the terminal;
   performing authentication between the terminal and the first access point based on the data for authentication for the estimated service execution time; and
   providing, by the first access point, a content corresponding to the service request message to the terminal, when the authentication between the terminal and the first access point is successful,
   wherein the service request message includes information on quality of service (Qos) constraint, terminal identification (ID) information, and session ID information.

2. The method for providing the service of claim 1, further comprising:
   after the transmitting of the service request message,
   confirming whether to provide the service to be provided by the first access point;
   transmitting the service request message to another access point constituting the edge network when the service to be provided may not be provided by the first access point; and
   transmitting the service request response message to the terminal, by a second access point capable of providing the service to be provided.

3. The method for providing the service of claim 2, further comprising:
   confirming, by the controller constituting the edge network, an access point that satisfies a predetermined QoS condition among the access points constituting the edge network, when there is no other access point capable of providing the service to be provided;
   determining a service execution cost based on a service type to be provided for each access point that satisfies the predetermined QoS condition; and
   determining an access point to provide the service to be provided, based on the service execution cost determined for each access point.

4. The method for providing the service of claim 3, wherein the service execution cost decreases as a required latency time of the service to be provided is shorter and increases as the number of resources required for the service to be provided is larger.

5. The method for providing the service of claim 3, further comprising:
   confirming the number of times providing the same service as the service to be provided previously for each access point, when there is no access point that satisfies the predetermined QoS condition; and
   determining an access point closest to the access point corresponding to the highest number of times as an access point to provide the service to be provided.

6. An edge network system including a plurality of access points, comprising:
   a terminal configured to transmit a service request message including a name of a service; and
   a first access point configured to receive the service request message from the terminal, transmit a service request response message including an estimated service execution time and data for authentication to the terminal, perform authentication with the terminal based on the data for authentication for the estimated service execution time, and provide a content corresponding to the service request message to the terminal when the authentication is successful,
   wherein the service request message includes information on quality of service (QOS) constraint, terminal identification (ID) information, and session ID information.

7. The edge network system of claim 6, wherein the first access point confirms whether to provide the service to be provided, and transmits the service request message to another access point constituting the edge network when the service to be provided may not be provided by the first access point, further comprising: a second access point configured to transmit the service request response message to the terminal in response to the service request message.

8. The edge network system of claim 7, further comprising:
   a controller configured to confirm an access point that satisfies a predetermined QoS condition among the access points constituting the edge network, when there is no other access point capable of providing the service to be provided, determine a service execution cost based on a service type to be provided for each access point that satisfies the predetermined QoS condition, and determine an access point to provide the service to be provided based on the service execution cost determined for each access point.

9. The edge network system of claim 8, wherein the service execution cost decreases as a required latency time of the service to be provided is shorter and increases as the number of resources required for the service to be provided is larger.

10. The edge network system of claim 8, wherein the controller confirms the number of times providing the same service as the service to be provided previously for each access point when there is no access point that satisfies the predetermined QoS condition and determines an access point closest to the access point corresponding to the highest number of times as the access point to provide the service to be provided.

* * * * *